United States Patent
Kawakami et al.

(10) Patent No.: US 9,635,214 B2
(45) Date of Patent: Apr. 25, 2017

(54) IMAGE PROCESSING SYSTEM FOR SETTING FILENAME TO RECEIVED IMAGE DATA, IMAGE PROCESSING METHOD THEREFOR, AND STORAGE MEDIUM

(71) Applicant: CANON KABUSHIKI KAISHA, Tokyo (JP)

(72) Inventors: Shuuhei Kawakami, Higashiyamato (JP); Ryuta Mori, Nagareyama (JP); Makiya Tamura, Tokyo (JP); Natsuki Kato, Kawasaki (JP); Fumitoshi Ito, Kawasaki (JP); Daijiro Miyamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/223,849

(22) Filed: Mar. 24, 2014

(65) Prior Publication Data
US 2014/0293362 A1    Oct. 2, 2014

(30) Foreign Application Priority Data

Mar. 26, 2013   (JP) .................................. 2013-065036

(51) Int. Cl.
*H04N 1/00*   (2006.01)
*H04N 1/21*   (2006.01)
*H04N 1/32*   (2006.01)

(52) U.S. Cl.
CPC ....... *H04N 1/2166* (2013.01); *H04N 1/00214* (2013.01); *H04N 1/00209* (2013.01); *H04N 1/32101* (2013.01); *H04N 2201/0094* (2013.01); *H04N 2201/21* (2013.01); *H04N 2201/216* (2013.01); *H04N 2201/3205* (2013.01); *H04N 2201/3207* (2013.01); *H04N 2201/3209* (2013.01); *H04N 2201/3226* (2013.01); *H04N 2201/3278* (2013.01)

(58) Field of Classification Search
None
See application file for complete search history.

(56) References Cited

U.S. PATENT DOCUMENTS 8,203,762 B2 *   6/2012  Arai .................... H04N 1/00795
                                                    358/403
2003/0035141 A1 *  2/2003  Ilda
(Continued)

FOREIGN PATENT DOCUMENTS

| JP | 2004-112333 A | 4/2004 |
| JP | 2008178067 A | 7/2008 |
| JP | 2009017482 A | 1/2009 |

*Primary Examiner* — Miya J Williams
(74) *Attorney, Agent, or Firm* — Canon U.S.A., Inc. IP Division

(57) ABSTRACT

An image processing system includes a storage unit configured to store an address book to be used to set a transmission destination of image data, a reception unit configured to receive image data, an acquisition unit configured to acquire a name registered in the address book in association with transmission source information of the image data received by the reception unit, a setting unit configured to set a filename using the name acquired by the acquisition unit to the image data received by the reception unit, and a transmission unit configured to transmit the image data to which the filename is set by the setting unit.

9 Claims, 17 Drawing Sheets

(56) References Cited

U.S. PATENT DOCUMENTS

| | | | |
|---|---|---|---|
| 2008/0100875 A1* | 5/2008 | Takenoshita et al. | 358/403 |
| 2008/0151330 A1* | 6/2008 | Takahata | H04N 1/00352 358/497 |
| 2009/0002742 A1* | 1/2009 | Kasatani | H04N 1/32133 358/1.13 |
| 2010/0002255 A1* | 1/2010 | Fukushima | H04N 1/00206 358/1.15 |
| 2014/0293361 A1* | 10/2014 | Mori et al. | 358/403 |

* cited by examiner

FIG.11

1100 TRANSFER SETTING hostname,sharedserver ~1101 folderpath,root/ ~1102 username,administrator ~1103 password,32942xc45 ~1104 filenamerule,[REGISTNAME]_[FAXNUMBER]_[DATE&TIME] ~1105 folderrule,[REGISTNAME]/[FAXNUMBER]/[DATE] ~1106

FIG.12

| DESTINATION ID *1201* | NAME *1202* | FAX NUMBER *1203* |
|---|---|---|
| 0001 | ABC CORPORATION | 0311112222 |
| 0002 | X CORPORATION | 0333334444 |
| 0003 | Y REAL ESTATE COMPANY | 0355556666 |
| 0004 | Z BRANCH OFFICE | 0377778888 |
| . . . . | . . . . | . . . . |

*1200* ADDRESS BOOK

FIG.16

1600 FILENAME SETTING SCREEN

SET FILENAME

FIRST KEYWORD    [REGISTERED NAME] ▼ ~1601

SECOND KEYWORD    [FAX NUMBER] ▼ ~1602

THIRD KEYWORD    [DATE AND TIME] ▼ ~1603

SEPARATOR    [_] UNDERSCORE ▼ ~1604

~1605
[REGISTERED NAME]_[FAX NUMBER]_[DATE AND TIME]

| CANCEL | RETURN | NEXT |
| --- | --- | --- |
| 821 | 822 | 823 |

FIG.17

1700 FOLDER PATH SETTING SCREEN

SET FOLDER PATH

1701 — ☑ SPECIFY HIERARCHY AND STORE RECEIVED FAX INTO THIS HIERARCHY

1702 — ☑ [REGISTERED NAME] / [FAX NUMBER] / [DATE]

1703 — ☐ [DATE] / [REGISTERED NAME] / [FAX NUMBER]

1704 — ☐ [FAX NUMBER] / [REGISTERED NAME] / [DATE]

| CANCEL | RETURN | NEXT |
|--------|--------|------|
| 921 | 922 | 923 |

IMAGE PROCESSING SYSTEM FOR SETTING FILENAME TO RECEIVED IMAGE DATA, IMAGE PROCESSING METHOD THEREFOR, AND STORAGE MEDIUM

BACKGROUND OF THE INVENTION

Field of the Invention

The present invention relates to an image processing system for setting a filename to received image data, an image processing method therefor, and a storage medium.

Description of the Related Art

Conventionally, there has been known a function of automatically transferring image data received by utilizing facsimile (Group 3 (G3) FAX and Internet FAX) and the like to a preset transfer destination. At this time, a filename according to a preset rule can be set to the image data to be transferred.

Japanese Patent Application Laid-Open No. 2004-112333 discusses that a filename using identification information of a transmission source (Transmitting Subscriber Identification (TSI)=a fax number of a transmission source) is set to image data received by facsimile. Further, Japanese Patent Application Laid-Open No. 2004-112333 also discusses that a filename generated by combining a plurality of types of information, like a combination of a TSI and a date and time, is set.

According to the method discussed in Japanese Patent Application Laid-Open No. 2004-112333, a fax number of a transmission source is set as a filename. However, since a normal user does not remember all of fax numbers of concerned parties, it is difficult to immediately recognize the transmission source only by viewing the filename. In this case, there is such a problem that, for example, the user can recognize the transmission source only after referring to an address book based on the fax number set as the filename as a key to acquire a name registered in association with this fax number, and this process is cumbersome.

Further, according to the method discussed in Japanese Patent Application Laid-Open No. 2004-112333, there is such a problem that a filename generated by combining a plurality of types of information can be set, but an arrangement order among these information pieces cannot be changed, which impairs the usability for users.

SUMMARY OF THE INVENTION

The present invention is directed to an image processing system capable of easily configuring a setting regarding a filename of received image data.

According to an aspect of the present invention, an image processing system includes a storage unit configured to store an address book to be used to set a transmission destination of image data, a reception unit configured to receive image data, an acquisition unit configured to acquire a name registered in the address book in association with transmission source information of the image data received by the reception unit, a setting unit configured to set a filename using the name acquired by the acquisition unit to the image data received by the reception unit, and a transmission unit configured to transmit the image data to which the filename is set by the setting unit.

Further features of the present invention will become apparent from the following description of exemplary embodiments with reference to the attached drawings.

BRIEF DESCRIPTION OF THE DRAWINGS

FIG. 11 illustrates a transfer setting according to the exemplary embodiment of the present invention.

FIG. 12 illustrates an address book according to the exemplary embodiment of the present invention.

FIG. 16 illustrates an operation screen of an MFP according to a second exemplary embodiment of the present invention.

FIG. 17 illustrates an operation screen of the MFP according to the second exemplary embodiment of the present invention.

DESCRIPTION OF THE EMBODIMENTS

Various exemplary embodiments, features, and aspects of the invention will be described in detail below with reference to the drawings. The exemplary embodiments that will be described below are not intended to limit the present invention recited in the appended claims. Further, not all combinations of features described in the exemplary embodiments are necessarily essential to the solution of the invention.

Figure 1:
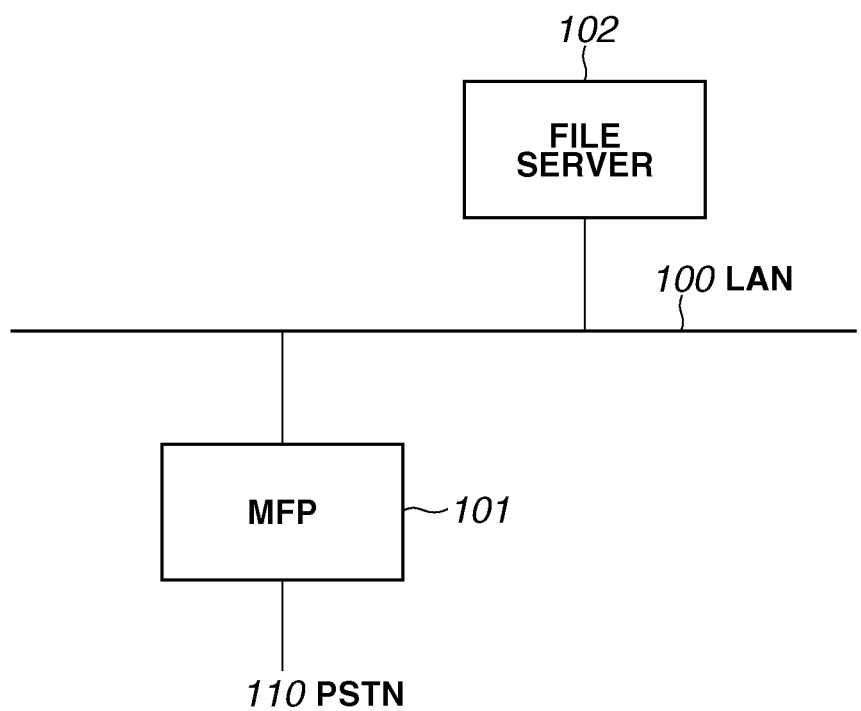
FIG. 1 illustrates an entire image processing system according to an exemplary embodiment of the present invention.

First, a first exemplary embodiment of the present invention will be described. FIG. 1 illustrates an entire image processing system. An MFP 101 and a file server 102 are connected to each other in a local area network (LAN) 100 so that communication can be performed therebetween. The MFP 101 is an example of an image processing apparatus. The file server 102 is an example of an external server. In the present example, the entire system including the MFP 101 and the file server 102 is treated as an image processing system, but the MFP 101 alone can be also referred to as an image processing system.

The MFP 101 is connected to a public switched telephone network (PSTN) 110, and can communicate image data by facsimile between a facsimile apparatus (not-illustrated) and the MFP 101.

Figure 2:
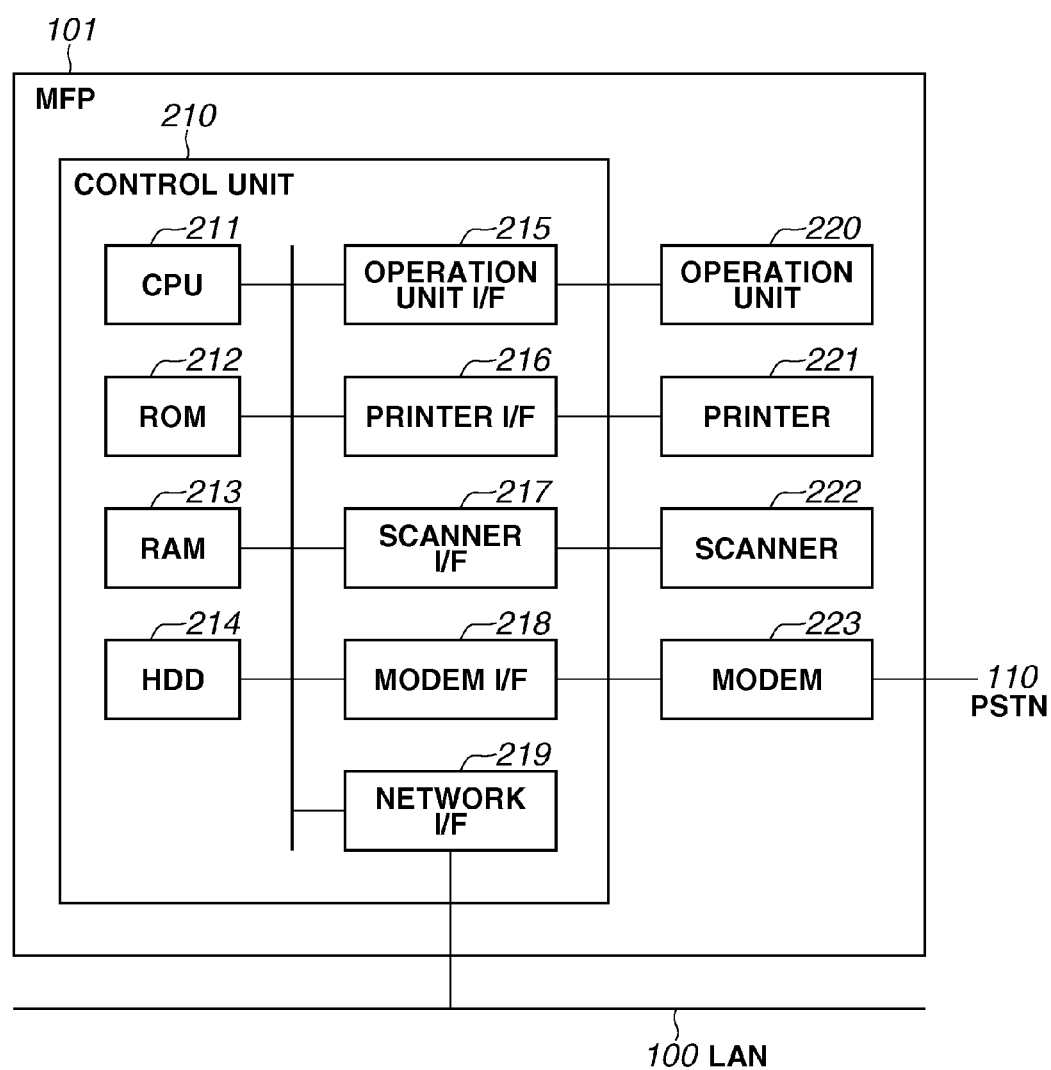
FIG. 2 illustrates a hardware configuration of a multifunction peripheral (MFP) according to the exemplary embodiment of the present invention.

FIG. 2 illustrates a hardware configuration of the MFP 101. A control unit 210, which includes a central processing unit (CPU) 211, controls an operation of the entire MFP 101. The CPU 211 reads a control program stored in a read only memory (ROM) 212 to perform various types of control such as reading, printing, and communication. A random access memory (RAM) 213 is used as a temporary storage area such as a main memory or a work area of the CPU 211. In the present example, the MFP 101 is configured in such a manner that the single CPU 211 performs processing illustrated in flowcharts that will be described below with use of a single memory (the RAM 213 or a hard disk drive (HDD) 214). However, the MFP 101 may be configured in a different manner. For example, the MFP 101 can be configured to perform the processing illustrated in the flowcharts by causing a plurality of CPUs and a plurality of RAMS or HDDs to operate cooperatively.

The HDD 214 stores image data and various programs. An operation unit interface (I/F) 215 connects an operation unit 220 and the control unit 210. The operation unit 220 includes a liquid-crystal display unit having a touch panel function, a keyboard, and the like. The operation unit 220 plays a role as a reception unit for receiving a user's operation, input, and instruction.

A printer I/F 216 connects a printer 221 and the control unit 210. Image data to be printed by the printer 221 is transferred from the control unit 210 via the printer I/F 216, and is printed onto a recording medium by the printer 221.

A scanner I/F 217 connects a scanner 222 and the control unit 210. The scanner 222 reads an image on a document to generate image data, and inputs the generated image data to the control unit 210 via the scanner I/F 217. The MFP 101 can transmit the image data generated by the scanner 222 by file transmission or e-mail transmission.

A modem I/F 218 connects a modem 223 and the control unit 210. The modem 223 performs facsimile communication of image data between the facsimile apparatus (not-illustrated) and the MFP 101. A network I/F 219 connects the control unit 210 (the MFP 101) to the LAN 100. The MFP 101 transmits image data and information to and receives various types of information from an external apparatus (the file server 102 and the like) on the LAN 100 via the network I/F 219.

Figure 3:
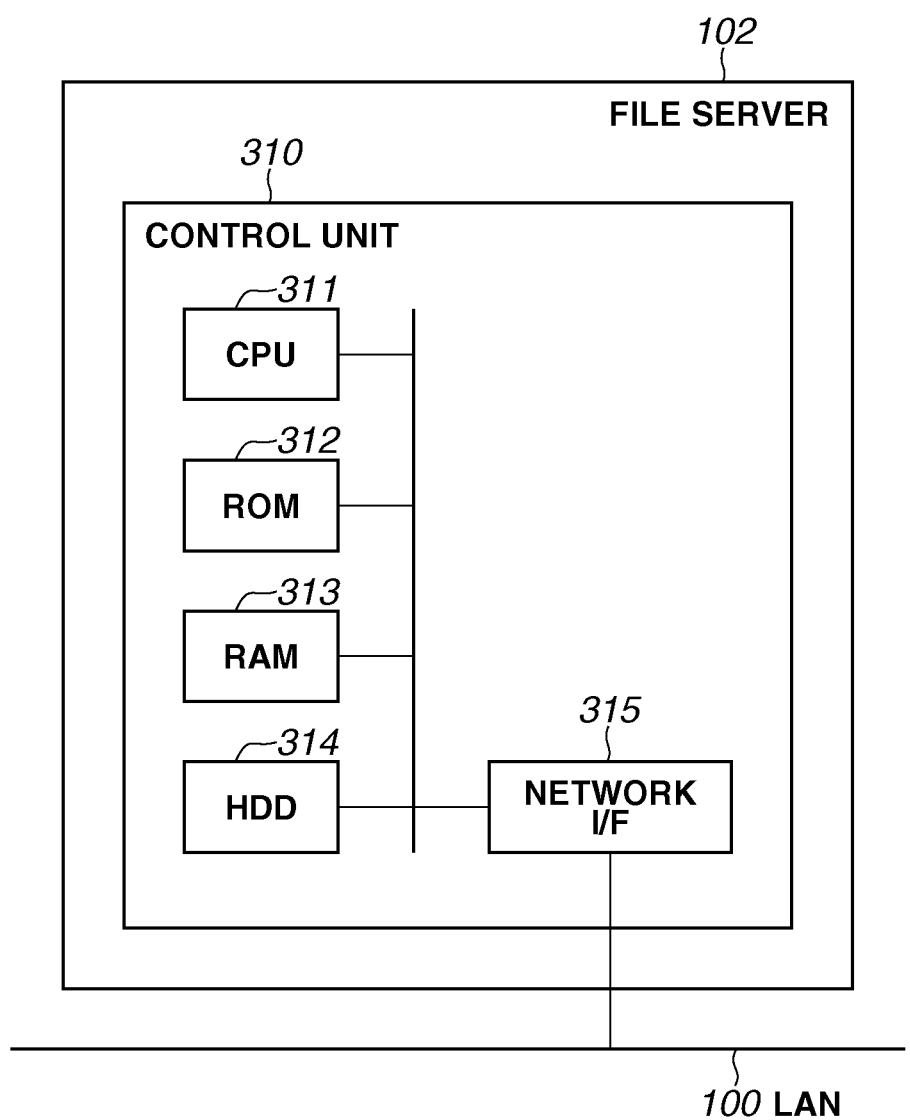
FIG. 3 illustrates a hardware configuration of a file server according to the exemplary embodiment of the present invention.

FIG. 3 illustrates a hardware configuration of the file server 102. A control unit 310, which includes a CPU 311, controls an operation of the entire file server 102. The CPU 311 reads a control program stored in a ROM 312 to perform various types of control processing. A RAM 313 is used as a temporary storage area such as a main memory or a work area of the CPU 311. An HDD 314 stores image data and various programs.

A network I/F 315 connects the control unit 310 (the file server 102) to the LAN 100. The file server 102 transmits and receives various types of information between another apparatus on the LAN 100 and the file server 102 via the network I/F 315.

Figure 4:
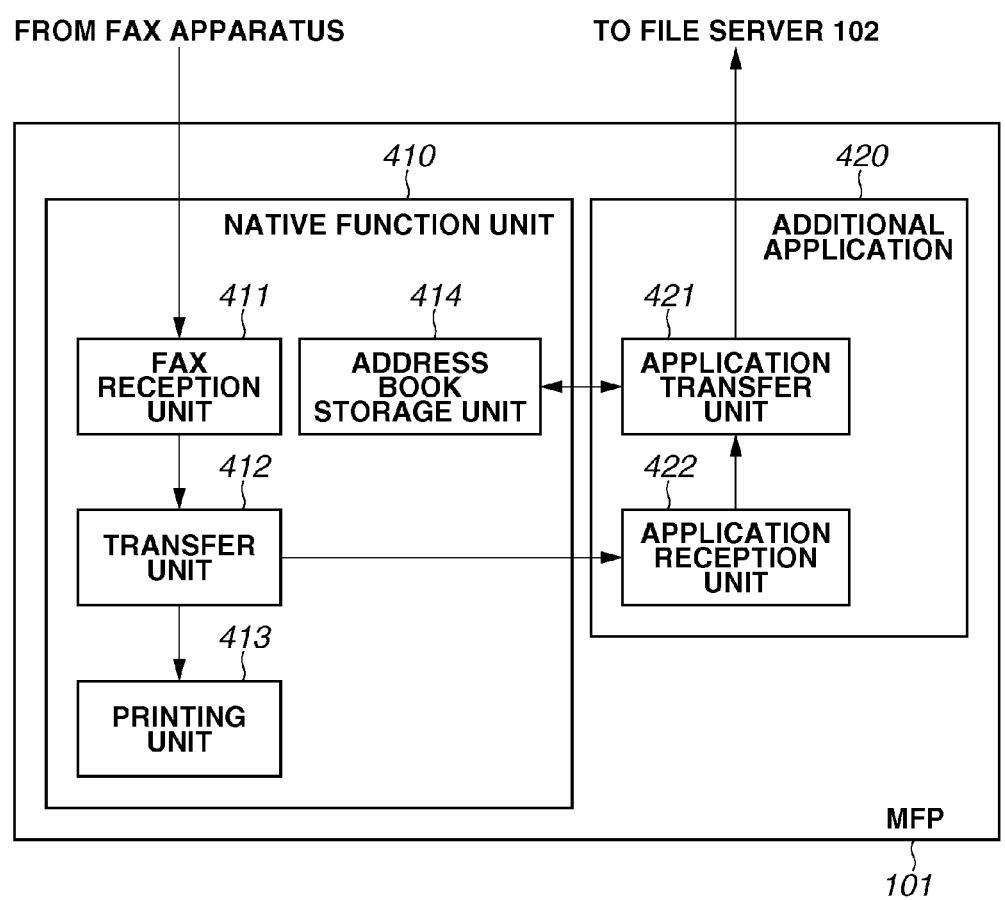
FIG. 4 illustrates a software configuration of the MFP according to the exemplary embodiment of the present invention.

FIG. 4 illustrates a software configuration of the MFP 101. The MFP 101 is mainly divided into two parts, i.e., a native function unit 410 and an additional application 420. While respective units included in the native function unit 410 are functions provided to the MFP 101 as standard functions, the additional application 420 is an application additionally installed in the MFP 101. The additional application 420 is an application based on Java (registered trademark), and can easily realize an addition of a function to the MFP 101. Another additional application (not-illustrated) may be installed in the MFP 101.

A FAX reception unit 411 receives image data transmitted via the PSTN 110 by facsimile. The image data received by the FAX reception unit 411 is converted into a Portable Document Format (PDF) by the FAX reception unit 411, and then is provided to a transfer unit 412. Further, at this time, the FAX reception unit 411 generates a control file that contains transmission source information (a fax number of a transmission source) of the image data and a reception date and time of the image data, and provides the generated control file to the transfer unit 412 together with the image data.

The transfer unit 412 transfers the image data received from the FAX reception unit 411 according to a preset condition. A printing unit 413, the file server 102, a personal computer (PC) (not illustrated) on the LAN 100, and the like can be set as a transfer destination of the image data. However, in the present example, the MFP 101 is set such that all image data received by the FAX reception unit 411 are first transferred to the additional application 420.

The transfer unit 412 has a File Transfer Protocol (FTP) client function, and transfers the image data by using FTP to an application reception unit 422 having an FTP server function. The control file generated by the FAX reception unit 411 is also transferred by using FTP to the application reception unit 422 together with the image data. An address book storage unit 414 stores address information registered by a user of the MFP 101. The details of an address book will be described below with referent to FIG. 12.

The application reception unit 422 receives the image data internally transferred from the transfer unit 412, and provides the received image data to an application transfer unit 421. The application transfer unit 421 transfers (transmits) the image data to the file server 102 according to a setting configured by a method that will be described below. For this transfer, the application transfer unit 421 can use Server Message Block (SMB), Distributed Authoring and Versioning protocol for the WWW (WebDAV), and the like, besides FTP. Further, the application transfer unit 421 is permitted to access the address book storage unit 414, and acquires a registered name that will be described below.

Figure 5:
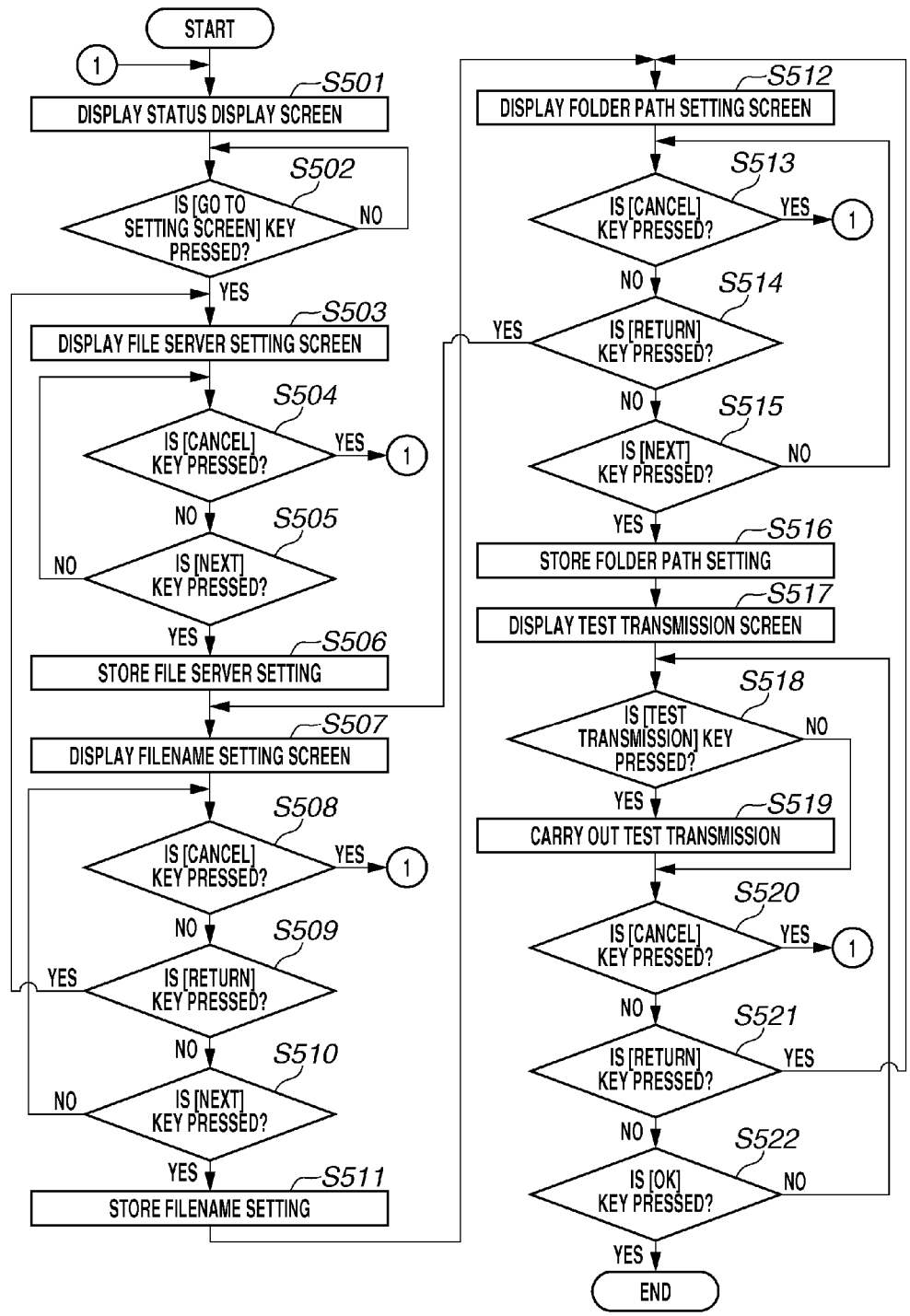
FIG. 5 is a flowchart illustrating an operation of the MFP according to the exemplary embodiment of the present invention.

FIG. 5 is a flowchart illustrating a setting operation for transferring image data received by the MFP 101 by facsimile to the file server 102. The CPU 211 of the MFP 101 executes the control program stored in the HDD 214 to realize each operation (each step) illustrated in the flowchart of FIG. 5.

In step S501, the MFP 101 displays a status display screen 600 (FIG. 6) on the operation unit 220. A message indicating a current operation status of a fax transfer function (the additional application 420) is displayed in a status display area 601 on the status display screen 600. In the illustrated example, the message indicates that the additional application 420 is working normally now. For example, if the additional application 420 fails in transferring image data to the file server 102, or the additional application 420 is in such a state that it is not working normally, a message indicating such a situation is displayed in the status display area 601. An operation key for updating a displayed content in the status display area 601 may be further provided on the status display screen 600.

Figure 6:
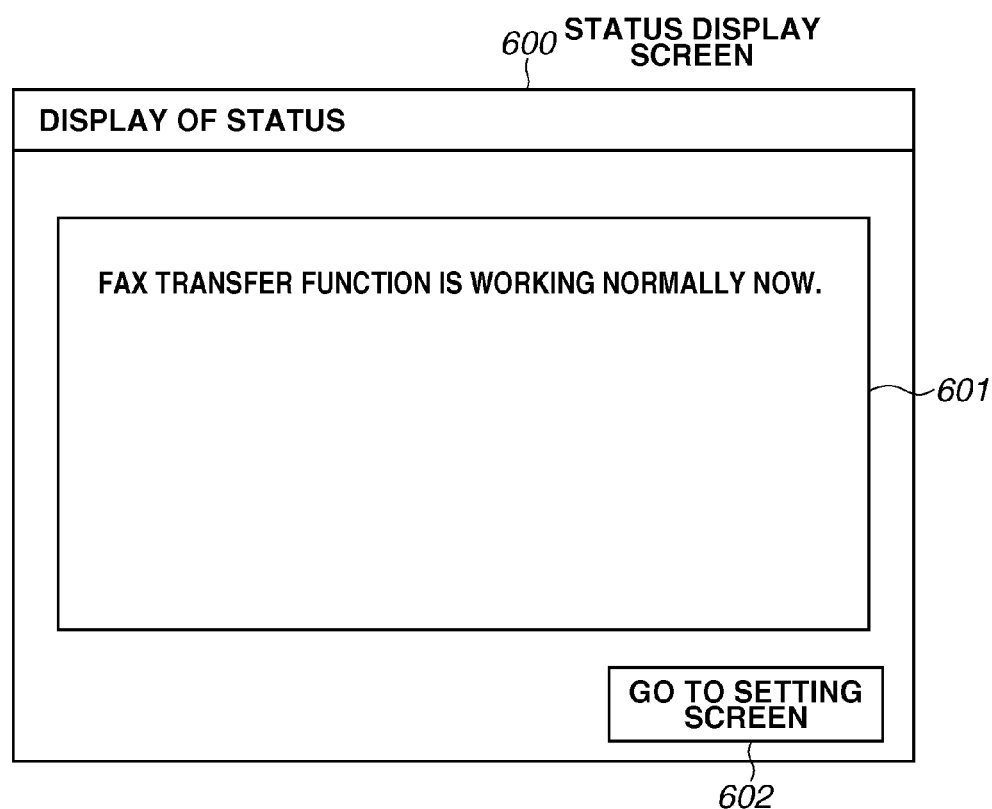
FIG. 6 illustrates an operation screen of the MFP according to the exemplary embodiment of the present invention.

In step S502, the MFP 101 determines whether a [GO TO SETTING SCREEN] key 602 on the status display screen 600 is pressed. At this time, the MFP 101 waits until the [GO TO SETTING SCREEN] key 602 is pressed. If the MFP 101 determines that the [GO TO SETTING SCREEN] key 602 is pressed (YES in step S502), the processing proceeds to step S503. FIGS. 5 and 6 illustrate an example in which only a single key (the [GO TO SETTING SCREEN] key 602) is displayed on the status display screen 600, but respective keys for directly shifting to respective screens that will be described below (FIGS. 7 to 10) may be provided on the status display screen 600.

In step S503, the MFP 101 displays a file server setting screen 700 (FIG. 7) on the operation unit 220. At this time, if there is a setting already stored in step S506 that will be described below, the MFP 101 displays the file server setting screen 700 with this setting content preset thereto. The user of the MFP 101 inputs information for identifying the file server 102 and information for accessing the file server 102 via the file server setting screen 700.

More specifically, the user inputs a host name of the file server 102 into a host name 701. The user inputs a start point of a folder path for identifying a storage destination of image data, into a folder path 702. The user inputs authentication information (a user name and a password) required to log in to the file server 102 into a user name 703 and a password 704.

In step S504, the MFP 101 determines whether a [CANCEL] key 711 is pressed. If the MFP 101 determines that the [CANCEL] key 711 is pressed (YES in step S504), the processing returns to step S501, and the MFP 101 displays the status display screen 600. If the MFP 101 determines that the [CANCEL] key 711 is not pressed (NO in step S504), the processing proceeds to step S505, and the MFP 101 determines whether a [NEXT] key 712 is pressed. If the MFP 101 determines that the [NEXT] key 712 is pressed, (YES in step S505), the processing proceeds to step S506. If the MFP 101 determines that the [NEXT] key 712 is not pressed (NO in step S505), the processing returns to step S504.

In step S506, the MFP 101 stores the file server setting input in the fields 701 to 704 on the file server setting screen 700 into the HDD 214. In step S507, the MFP 101 displays a filename setting screen 800 (FIG. 8) on the operation unit 220. At this time, if there is a setting already stored in step S511 that will be described below, the MFP 101 displays the filename setting screen 800 with this setting content preset thereto. The user of the MFP 101 specifies a setting rule of a filename to be set to image data to be transferred to the file server 102 via the filename setting screen 800.

A filename generated by combining three types of information [REGISTERED NAME], [FAX NUMBER], and [DATE AND TIME] can be set to image data that the additional application 420 transfers to the file server 102. The information [REGISTERED NAME] is a name preregistered in the address book in association with a fax number of a transmission source of image data. The information [FAX NUMBER] is a fax number of a transmission source of image data. The information [DATE AND TIME] is a reception date and time of image data.

The user of the MFP 101 can select a separator (delimiter) for delimiting the above-described three types of information by using operation keys 801 to 803. If the operation key 801 is pressed, a symbol [-] (hyphen) is selected. If the operation key 802 is pressed, a symbol [_] (underscore) is selected. If the operation key 803 is pressed, a symbol [ ] (space) is selected. In the illustrated example, it can be seen that the symbol [_] (underscore) is selected.

Further, the user of the MFP 101 can specify an arrangement order among the above-described three types of information by using check boxes 813 to 815. If the check box 813 is checked, a filename is set by combining the three types of information in the arrangement order of [REGISTERED NAME], [FAX NUMBER], and [DATE AND TIME]. For example, if the registered name, the fax number, and the date and time are "ABC Corporation", "0311112222", and "Jan. 1, 2013 at 12 o'clock, 15 minutes, and 10 seconds", respectively, a filename "ABC Corporation_0311112222_20130101121510.pdf" is set.

If the check box 814 is checked, a filename is set by combining the three types of information in the arrangement order of [DATE AND TIME], [REGISTERED NAME], and [FAX NUMBER]. If the check box 815 is checked, a filename is set by combining the three types of information in the arrangement order of [FAX NUMBER], [REGISTERED NAME], and [DATE AND TIME]. In the present example, all possible arrangement orders are not presented as candidates (only a part of possible arrangement orders are presented as candidates), but all possible arrangement orders may be displayed as candidates.

In step S508, the MFP 101 determines whether a [CANCEL] key 821 is pressed. If the MFP 101 determines that the [CANCEL] key 821 is pressed (YES in step S508), the processing returns to step S501, and the MFP 101 displays the status display screen 600. If the MFP 101 determines that the [CANCEL] key 821 is not pressed (NO in step S508), the processing proceeds to step S509, and the MFP 101 determines whether a [RETURN] key 822 is pressed. If the MFP 101 determines that the [RETURN] key 822 is pressed (YES in step S509), the processing returns to step S503, and the MFP 101 displays the file server setting screen 700. If the MFP 101 determines that the [RETURN] key 822 is not pressed (NO in step S509), the processing proceeds to step S510, and the MFP 101 determines whether a [NEXT] key 823 is pressed. If the MFP 101 determines that the [NEXT] key 823 is pressed (YES in step S510), the processing proceeds to step S511. If the MFP 101 determines that the [NEXT] key 823 is not pressed (NO in step S510), the processing returns to step S508.

In step S511, the MFP 101 stores the contents specified via the filename setting screen 800 into the HDD 214. In step S512, the MFP 101 displays a folder path setting screen 900 (FIG. 9) on the operation unit 220. At this time, if there is a setting already stored in step S516 that will be described below, the MFP 101 displays the folder path setting screen 900 with this setting content preset thereto. The user of the MFP 101 specifies a setting rule of a folder path for identifying a folder that serves as a storage destination of image data via the folder path setting screen 900.

If a check box 901 is checked, image data is stored into a folder specified in selection fields 911 to 913. If the check box 901 is not checked, image data is stored into an area indicated in the folder path 702 on the file server setting screen 700.

A type of information to be used as a folder name of a first hierarchal level (a highest hierarchal level among three hierarchal levels) is specified in the selection field 911. The user of the MFP 101 selects a type of information among candidates [REGISTERED NAME], [FAX NUMBER], and [DATE] presented by a pull-down menu. The information [REGISTERED NAME] is a name preregistered in the address book in association with a fax number of a transmission source of image data. The information [FAX NUMBER] is a fax number of a transmission source of image data. The information [DATE] is a reception date of image data. The user can leave the selection field 911 unspecified without selecting any type therein. In this case, image data is stored into the area specified in the folder path 702 on the file server setting screen 700.

A type of information to be used as a folder name of a second hierarchal level (a middle hierarchal level among the three hierarchal levels) is specified in the selection field 912. The user of the MFP 101 selects a type of information among candidates [REGISTERED NAME], [FAX NUMBER], and [DATE] presented by a pull-down menu in a similar manner to the first hierarchal level. The user can leave the selection field 912 unspecified without selecting any type therein. In this case, image data is stored into the folder specified in the selection field 911.

A type of information to be used as a folder name of a third hierarchal level (a lowest hierarchal level among the three hierarchal levels) is specified in the selection field 913. The user of the MFP 101 selects a type of information among candidates [REGISTERED NAME], [FAX NUMBER], and [DATE] presented by a pull-down menu in a similar manner to the first hierarchal level. The user can leave the selection field 913 unspecified without selecting any type therein. In this case, image data is stored into the folder specified in the selection field 912.

The arrangement order among the respective types of information according to the selections of the respective hierarchal levels in the selection fields 911 to 913 is displayed in a display field 914. In the illustrated example, the display field 914 indicates that [REGISTERED NAME], [FAX NUMBER], and [DATE] are selected as the folder names of the first, second, and third hierarchal levels, respectively. An official folder path is completed by adding the folder path displayed in the display field 914 to the end of the character string specified in the folder path 702 on the file server setting screen 700. For example, if the registered name, the fax number, and the date are "ABC Corporation", "0311112222", and "Jan. 1, 2013", respectively, a folder path "root/ABC Corporation/0311112222/20130101" is set.

In step S513, the MFP 101 determines whether a [CANCEL] key 921 is pressed. If the MFP 101 determines that the [CANCEL] key 921 is pressed (YES in step S513), the processing returns to step S501, and the MFP 101 displays the status display screen 600. If the MFP 101 determines that the [CANCEL] key 921 is not pressed (NO in step S513), the processing proceeds to step S514, and the MFP 101 determines whether a [RETURN] key 922 is pressed. If the MFP 101 determines that the [RETURN] key 922 is pressed (YES in step S514), the processing returns to step S507, and the MFP 101 displays the filename setting screen 800. If the MFP 101 determines that the [RETURN] key 922 is not pressed (NO in step S514), the processing proceeds to step S515, and the MFP 101 determines whether a [NEXT] key 923 is pressed. If the MFP 101 determines that the [NEXT] key 923 is pressed (YES in step S515), the processing proceeds to step S516. If the MFP 101 determines that the [NEXT] key 923 is not pressed (NO in step S515), the processing returns to step S513.

In step S516, the MFP 101 stores the contents specified via the folder path setting screen 900 into the HDD 214. In step S517, the MFP 101 displays a test transmission screen 1000 (FIG. 10) on the operation unit 220. The user of the MFP 101 can carry out test transmission to the file server 102 via the test transmission screen 1000.

A fax number of an arbitrary transmission source for use in test transmission is input into a fax number 1001. Further, an arbitrary reception date and time for use in test transmission is input into a reception date and time 1002. Further, if a [CONFIRM SETTINGS] key 1011 is pressed, a filename under which image data is stored and a folder into which the image data is stored are displayed based on the fax number 1001, the reception date and time 1002, and the settings selected via the screens illustrated in FIGS. 7 to 9, although this is omitted from the flowchart of FIG. 5. From this display, the user can confirm the contents of the settings.

In step S518, the MFP 101 determines whether a [TEST TRANSMISSION] key 1012 is pressed. If the MFP 101 determines that the [TEST TRANSMISSION] key 1012 is pressed (YES in step S518), the processing proceeds to step S519. If the MFP 101 determines that the [TEST TRANSMISSION] key 1012 is not pressed (NO in step S518), the processing proceeds to step S520.

Figure 7:
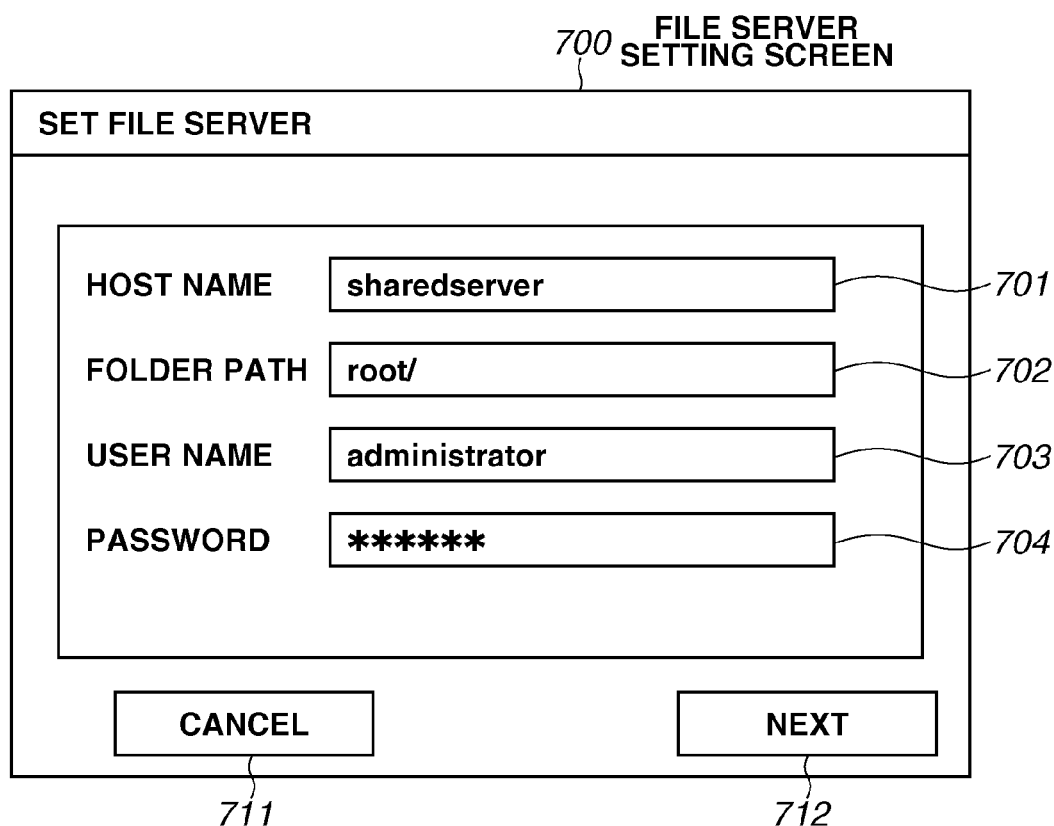
FIG. 7 illustrates an operation screen of the MFP according to the exemplary embodiment of the present invention.
Figure 8:
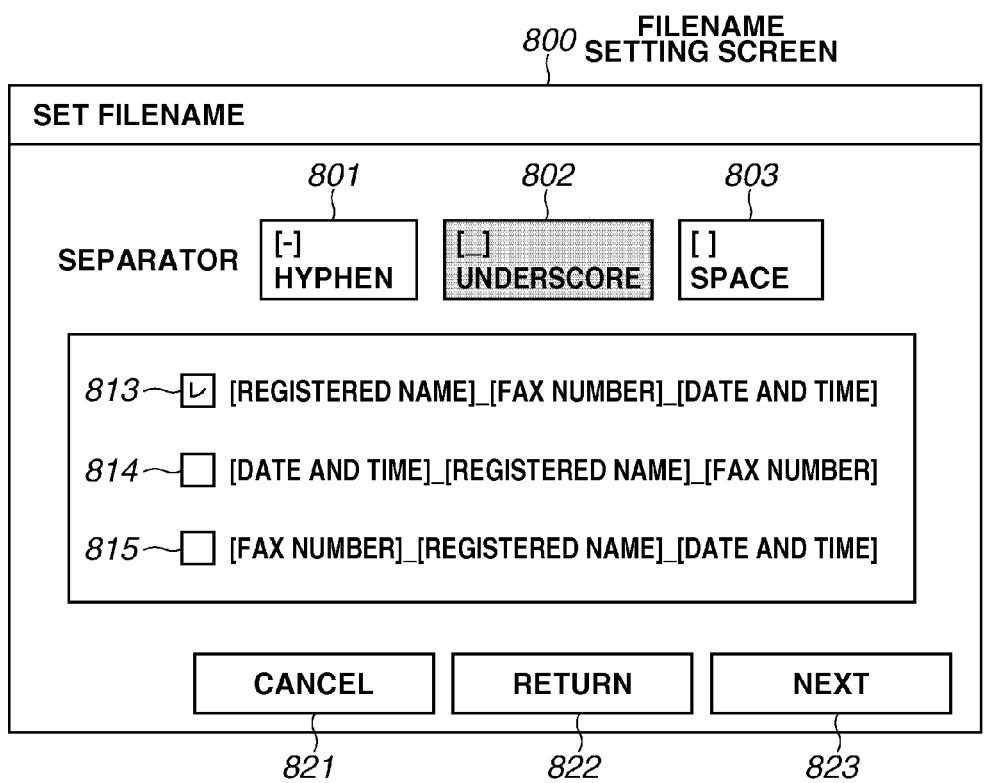
FIG. 8 illustrates an operation screen of the MFP according to the exemplary embodiment of the present invention.
Figure 9:
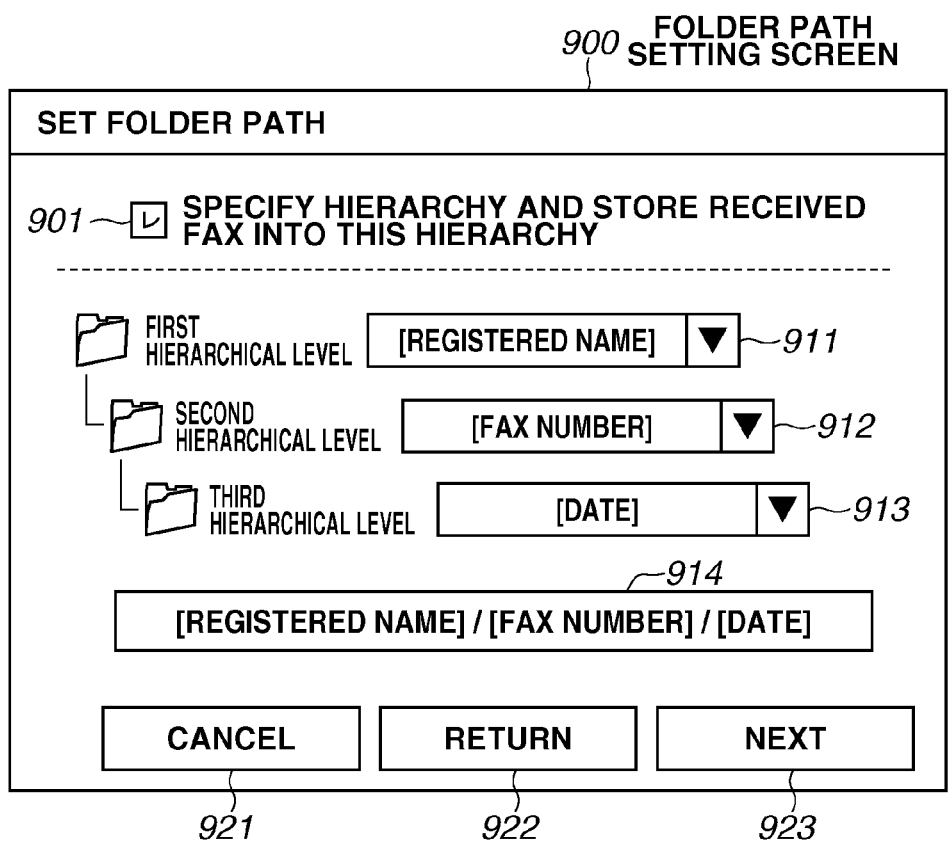
FIG. 9 illustrates an operation screen of the MFP according to the exemplary embodiment of the present invention.
Figure 10:
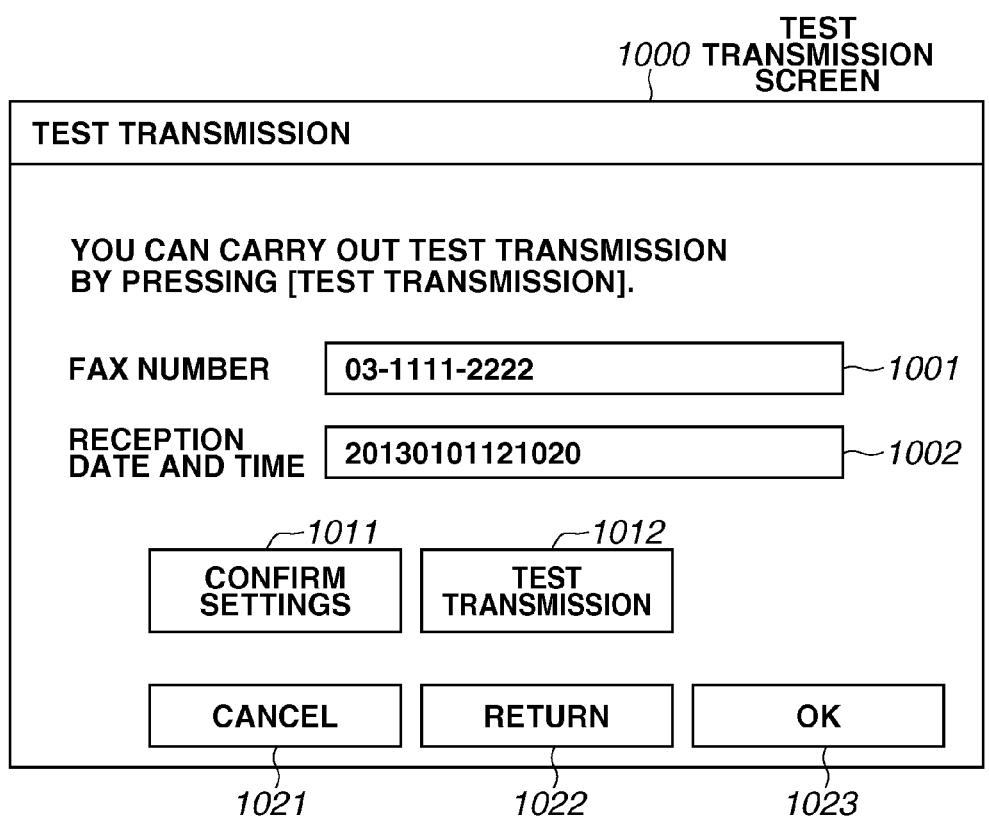
FIG. 10 illustrates an operation screen of the MFP according to the exemplary embodiment of the present invention.

In step S519, the MFP 101 carries out test transmission based on the contents of the fax number 1001 and the reception date and time 1002, and the contents set on the screens illustrated in FIGS. 7 to 9. In the test transmission, test image data held in advance in the additional application 420 (in the HDD 214) is actually transmitted to the file server 102. The user can confirm that image data is normally stored into the folder in the file server 102 by carrying out the test transmission. The MFP 101 may be configured to display a screen that indicates a result of the test transmission after carrying out the test transmission.

In step S520, the MFP 101 determines whether a [CANCEL] key 1021 is pressed. If the MFP 101 determines that the [CANCEL] key 1021 is pressed (YES in step S520), the processing returns to step S501, and the MFP 101 displays the status displays screen 600. If the MFP 101 determines that the [CANCEL] key 1021 is not pressed (NO in step S520), the processing proceeds to step S521, and the MFP 101 determines whether a [RETURN] key 1022 is pressed. If the MFP 101 determines that the [RETURN] key 1022 is pressed (YES in step S521), the processing returns to step S512, and the MFP 101 displays the folder path setting screen 900. If the MFP 101 determines that the [RETURN] key 1022 is not pressed (NO in step S521), the processing proceeds to step S522, and the MFP 101 determines whether an [OK] key 1023 is pressed. If the MFP 101 determines that the [OK] key 1023 is pressed (YES in step S522), the processing ends. If the MFP 101 determines that the [OK] key 1023 is not pressed (NO in step S522), the processing returns to step S518.

FIG. 11 illustrates a transfer setting 1100 set according to the flowchart of FIG. 5. The transfer setting 1100 is stored in the HDD 214 in a Comma Separated Vales (CSV) format or an Extensible Markup Language (XML) format, but may be stored in another format.

The host name of the file server 102, which is input in the host name 701 on the file server setting screen 700, is written in a line 1101. The start point of the folder path, which is input in the folder path 702 on the file server setting screen 700, is written in a line 1102. The user name for logging in to the file server 102, which is input in the user name 703 on the file server setting screen 700, is written in a line 1103. The password for logging in to the file server 102, which is input in the password 704 on the file server setting screen 700, is written in a line 1104.

The setting rule of a filename, which is set on the filename setting screen 800, is written in a line 1105. In the illustrated example, this rule is defined in such a manner that a filename is set with use of the separator [_] (underscore) in the arrangement order of [REGISTERED NAME], [FAX NUMBER], and [DATE AND TIME]. The setting rule of a folder path, which is set on the folder path setting screen 900, is written in a line 1106. In the illustrated example, this rule is defined in such a manner that a folder path is set in the arrangement order of [REGISTERED NAME], [FAX NUMBER], and [DATE].

FIG. 12 illustrates a content of an address book 1200 stored in the address book storage unit 414. A destination identification (ID) 1201 is an ID that uniquely indicates each destination registered in the address book 1200. A name 1202 is a name of each destination registered in the address book 1200. A fax number 1203 is a fax number of each destination registered in the address book 1200.

When the user wants to transmit image data read by the scanner 222 from the MFP 101 via the PSTN 110 by facsimile, the user can save time for and effort of specifying a destination by referring to the address book 1200. Not only a destination for facsimile transmission, but also a destination for an email, a destination for file transmission (FTP, SMB, and WebDAV), and the like may be registered in the address book 1200.

Figure 13:
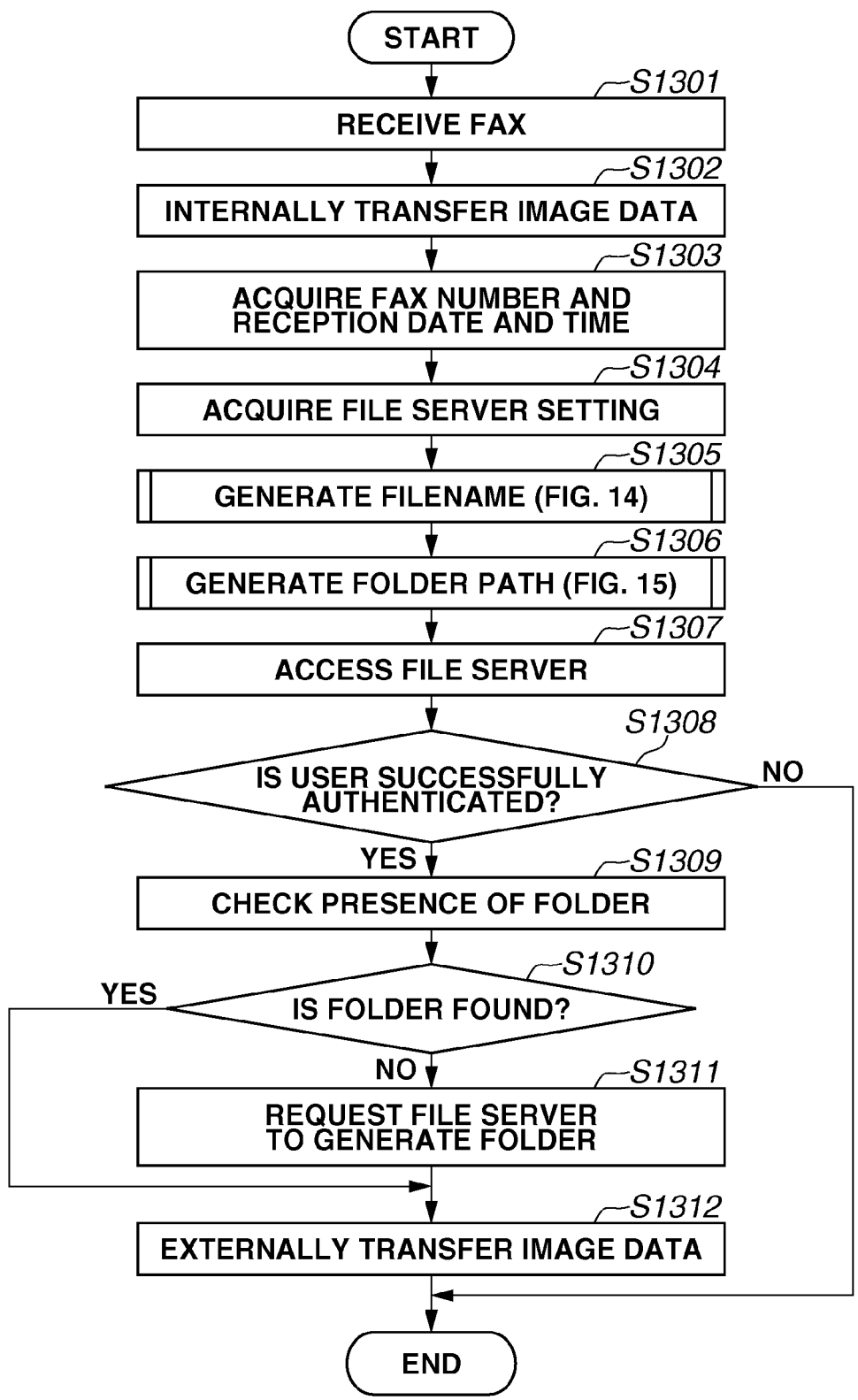
FIG. 13 is a flowchart illustrating an operation of the MFP according to the exemplary embodiment of the present invention.
Figure 14:
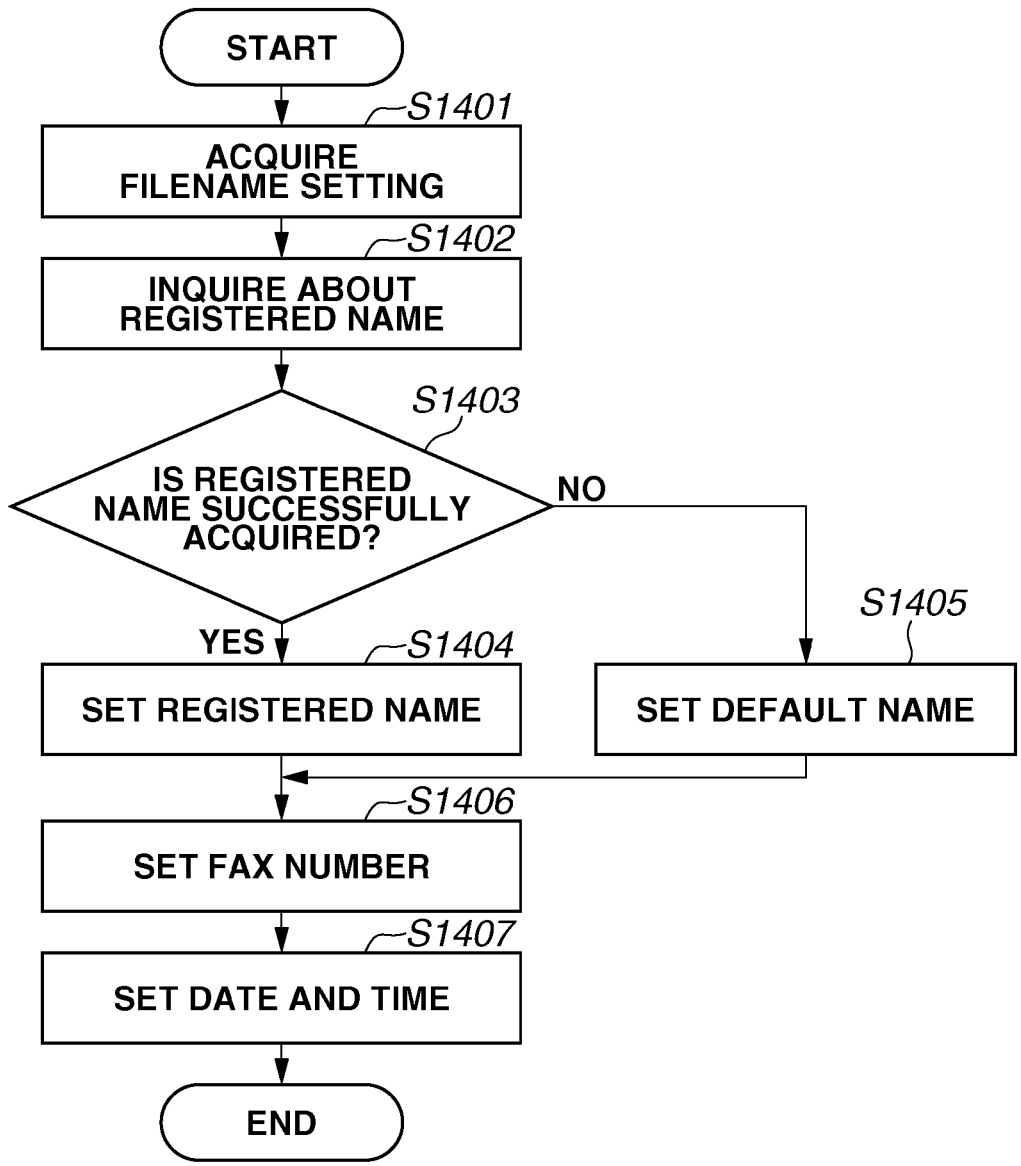
FIG. 14 is a flowchart illustrating an operation of the MFP according to the exemplary embodiment of the present invention.
Figure 15:
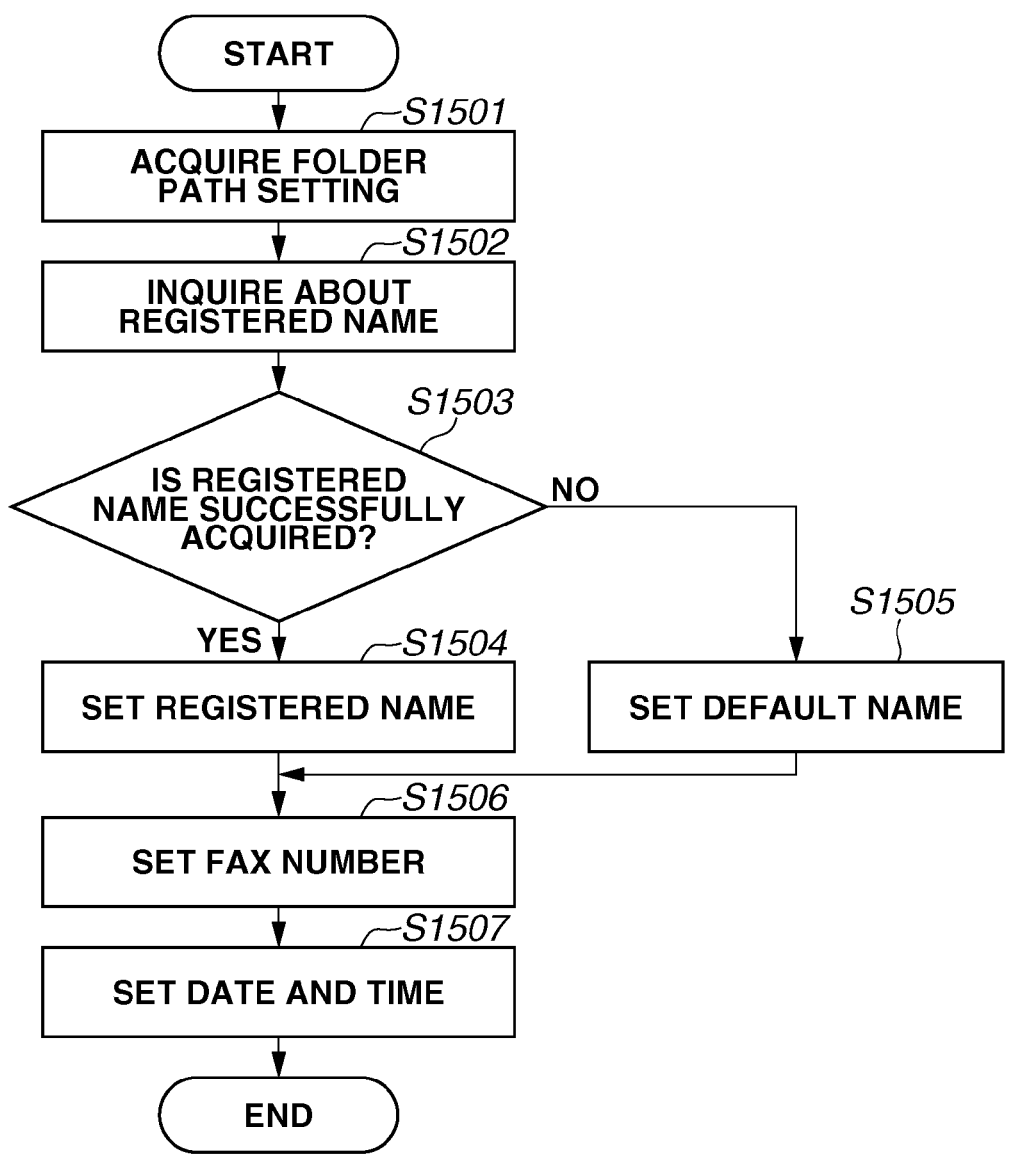
FIG. 15 is a flowchart illustrating an operation of the MFP according to the exemplary embodiment of the present invention.

FIGS. 13 to 15 are flowcharts illustrating an operation when the MFP 101 transfers image data received by facsimile to the file server 102. The CPU 211 of the MFP 101 executes the control program stored in the HDD 214 to realize each operation (each step) illustrated in the flowcharts of FIGS. 13 to 15.

In step S1301, the FAX reception unit 411 receives image data by facsimile. In step S1302, the transfer unit 412 internally transfers by using FTP the image data to the application reception unit 422. In step S1303, the application transfer unit 421 acquires a fax number of a transmission source and a reception date and time from a control file transferred together with the image data.

In step S1304, the application transfer unit 421 acquires the file server setting contained in the transfer setting 1100. In step S1305, the application transfer unit 421 generates a filename to be set to the image data. In step S1306, the application transfer unit 421 generates a folder path for identifying a storage destination of the image data.

In step S1307, the application transfer unit 421 accesses the file server 102. At this time, the application transfer unit 421 transmits the user name and the password contained in the file server setting acquired in step S1304 to the file server 102, and receives a result of authentication performed by the file server 102. In step S1308, the application transfer unit 421 determines whether the user is successfully authenticated (whether the user can log in to the file server 102). If the user is successfully authenticated (YES in step S1308), the processing proceeds to step S1309. If the user has failed in being authenticated (NO in step S1308), the processing ends.

In step S1309, the application transfer unit 421 checks whether there is a folder indicated by the folder path generated in step S1306 (the application transfer unit 421 makes an inquiry to the file server 102). In step S1310, the application transfer unit 421 determines whether there is a corresponding folder. If there is a corresponding folder (YES in step S1310), the processing proceeds to step S1312. If there is no corresponding folder (NO in step S1310), the processing proceeds to step S1311.

In step S1311, the application transfer unit 421 requests the file server 102 to generate a folder indicated by the folder path generated in step S1306. In step S1312, the application transfer unit 421 externally transfers the image data to the file server 102, and stores the image data into the folder indicated by the folder path generated in step S1306.

FIG. 14 is a flowchart illustrating the process of step S1305 in FIG. 13 in detail. In step S1401, the application transfer unit 421 acquires the filename setting contained in the transfer setting 1100. In step S1402, the application transfer unit 421 makes an inquiry to the address book storage unit 414 about a name registered in association with the fax number of the transmission source.

In step S1403, the application transfer unit 421 determines whether the registered name is successfully acquired from the address book storage unit 414. If the application transfer unit 421 determines that the registered name is successfully acquired (YES in step S1403), the processing proceeds to step S1404, and the application transfer unit 421 sets the acquired registered name as a part of the filename. If the application transfer unit 421 determines that the application transfer unit 421 has failed in acquiring the registered name (for example, the fax number of the transmission source is not registered in the address book) (NO in step S1403), the processing proceeds to step S1405, and the application transfer unit 421 sets a default name as a part of the filename. The default name is, for example, a character string "not available".

In step S1406, the application transfer unit 421 sets the fax number acquired in step S1303 as a part of the filename. In step S1407, the application transfer unit 421 sets the reception date and time acquired in step S1303 as a part of the filename. The settings in steps S1404 to S1407 are performed according to the content of the filename setting acquired in step S1401.

FIG. 15 is a flowchart illustrating the process of step S1306 in FIG. 13 in detail. In step S1501, the application transfer unit 421 acquires the folder path setting contained in the transfer setting 1100. In step S1502, the application transfer unit 421 makes an inquiry to the address book storage unit 414 about a name registered in association with the fax number of the transmission source. If the registered name has already been acquired in step S1402 in FIG. 14, the process of step S1502 may be omitted.

In step S1503, the application transfer unit 421 determines whether the registered name is successfully acquired from the address book storage unit 414. If the application transfer unit 421 determines that the registered name is successfully acquired (Yes in step S1503), the processing proceeds to step S1504, and the application transfer unit 421 sets the acquired registered name as a part of the folder path. If the application transfer unit 421 determines that the application transfer unit 421 has failed in acquiring the registered name (for example, the fax number of the transmission source is not registered in the address book) (NO in step S1503), the processing proceeds to step S1505, and the application transfer unit 421 sets the default name as a part of the folder path. The default name is, for example, the character string "not available".

In step S1506, the application transfer unit 421 sets the fax number acquired in step S1303 as a part of the folder path. In step S1507, the application transfer unit 421 sets the reception date acquired in step S1303 as a part of the folder path. The settings in steps S1504 to S1507 are performed according to the content of the folder path setting acquired in step S1501.

As described above, according to the present exemplary embodiment, the user can easily configure the setting regarding a filename of received image data, especially by providing the filename setting screen 800 illustrated in FIG. 8.

Next, a second exemplary embodiment of the present invention will be described. In the second exemplary embodiment, a filename setting screen 1600 illustrated in FIG. 16 is displayed, instead of the filename setting screen 800 described in the first exemplary embodiment. Further, a folder path setting screen 1700 illustrated in FIG. 17 is displayed, instead of the folder path setting screen 900 described in the first exemplary embodiment. Other configurations of the second exemplary embodiment are similar to those described in the first exemplary embodiment, and therefore descriptions thereof will be omitted herein.

The user of the MFP 101 specifies a setting rule of a filename to be set to image data to be transferred to the file server 102 via the filename setting screen 1600 illustrated in FIG. 16.

A type of information to be used as a first keyword (a keyword placed first among three keywords) is specified in a selection field 1601. The user of the MFP 101 selects a type of information from candidates [REGISTERED NAME], [FAX NUMBER], and [DATE AND TIME] presented by a pull-down menu. The information [REGISTERED NAME] is a name preregistered in the address book in association with a fax number of a transmission source of image data. The information [FAX NUMBER] is a fax number of a transmission source of image data. The information [DATE AND TIME] is a reception date and time of image data.

A type of information to be used as a second keyword (a keyword placed secondly among the three keywords) is specified in a selection field 1602. The user of the MFP 101 selects a type of information from candidates [REGISTERED NAME], [FAX NUMBER], and [DATE AND TIME] presented by a pull-down menu in a similar manner to the first keyword.

A type of information to be used as a third keyword (a keyword placed last among the three keywords) is specified in a selection field 1603. The user of the MFP 101 selects a type of information from candidates [REGISTERED NAME], [FAX NUMBER], and [DATE AND TIME] presented by a pull-down menu in a similar manner to the first keyword.

A separator (delimiter) for delimiting the above-described three types of information is specified in a selection field 1604. The user of the MFP 101 selects a separator from candidates [-] (hyphen), [_] (underscore), and [ ] (space) presented by a pull-down menu.

The arrangement order among the respective types of information and the separator according to the selections in the selection fields 1601 to 1604 are displayed in a display field 1605. In the illustrated example, the display field 1605 indicates that [REGISTERED NAME], [FAX NUMBER], [DATE AND TIME], and [_] (underscore) are set as the first keyword, the second keyword, the third keyword, and the separator, respectively. For example, if the registered name, the fax number, and the date and time are "ABC Corporation", "0311112222", and "Jan. 1, 2013 at 12 o'clock, 15 minutes, and 10 seconds", respectively, a filename "ABC Corporation_0311112222_20130101121510.pdf" is set.

Further, the user of the MFP 101 specifies a setting rule of a folder path for identifying a folder that serves as a storage destination of image data via the folder path setting screen 1700.

If a check box 1701 is checked, image data is stored into a folder specified in check boxes 1702 to 1704. On the other hand, if the check box 1701 is not checked, image data is stored into the area specified in the folder path 702 on the file server setting screen 700.

The folder path for identifying a storage destination of image data is set by combining the three types information [REGISTERED NAME], [FAX NUMBER], and [DATE]. The information [REGISTERED NAME] is a name preregistered in the address book in association with a fax number of a transmission source of image data. The information [FAX NUMBER] is a fax number of a transmission source of image data. The information [DATE] is a reception date of image data.

The user of the MFP 101 can specify an arrangement order among the above-described three types of information by using the check boxes 1702 to 1704. If the check box 1702 is checked, a folder path is set by combining the three types of information in the arrangement order of [REGISTERED NAME], [FAX NUMBER], and [DATE]. For example, if the registered name, the fax number, and the date are "ABC Corporation", "0311112222", and "Jan. 1, 2013", respectively, a folder path "root/ABC Corporation/0311112222/20130101" is set.

If the check box 1703 is checked, a folder path is set by combining the three types of information in the arrangement order of [DATE], [REGISTERED NAME], and [FAX NUMBER]. If the check box 1704 is checked, a folder path is set by combining the three types of information in the arrangement order of [FAX NUMBER], [REGISTERED NAME], and [DATE]. In the present example, all possible arrangement orders are not presented as candidates (only a part of possible arrangement orders are presented as candidates), but all possible arrangement orders may be displayed as candidates.

In this manner, as described in the first and second exemplary embodiments, the image processing system according to the exemplary embodiments of the present invention acquires a name registered in the address book in association with transmission source information (a fax number) of received image data. In addition, the image processing system is configured to set a folder path using the acquired name, and store the received image data into a folder indicated by the set folder path.

Further, the image processing system according to the exemplary embodiments of the present invention is configured to set a folder path using transmission source information or a reception date of received image data, and store the received image data into a folder indicated by the set folder path.

Further, the image processing system according to the exemplary embodiments of the present invention is configured to receive a selection of an arrangement order among a plurality of types of information, set a folder path by combining the plurality of types of information according to the received selection, and store the received image data into a folder indicated by the set folder path.

According to these configurations, the user can easily configure the setting for storing received image data pieces while sorting them into a plurality of folders.

The above descriptions are made based on the example in which the three types of information, [REGISTERED NAME], [FAX NUMBER], and [DATE] (or [DATE AND TIME]) are combined. However, another type of information may be used. Further, two types of information, or four or more types of information may be combined.

Further, image data transferred to the file server 102 is not limited to image data received by facsimile, and can be image data received by e-mail or another communication protocol.

Further, the above descriptions are based on an example in which image data is stored into a folder in a file server (the file server 102) on the network. However, image data may be stored into a folder in the HDD 214 of the MFP 101.

Exemplary embodiments of the present invention can be also realized by performing the following processing. That is, a storage medium storing a program code of software capable of realizing the functions of the above-described exemplary embodiments is supplied to a system or an apparatus, and a computer (or a CPU, a micro processing unit (MPU), or the like) of the system or the apparatus reads the program code stored in the storage medium.

In this case, the program code itself read from the storage medium realizes the functions of the above-described exemplary embodiments, and this program code and the storage medium storing this program code constitute the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-065036 filed Mar. 26, 2013, which is hereby incorporated by reference herein in its entirety.

What is claimed is:

1. An image processing apparatus comprising:
a storage unit configured to store an address book which registers a plurality of names associated with numbers; and
a processor for executing a computer program to execute a process which comprises:
controlling to display a setting screen in which a user specifies a setting rule of a filename, wherein the setting screen displays a plurality of fields in which a user selects types of information to be used for the filename and further displays an arrangement order of the selected types of information by combining a separator and the types of information selected in the plurality of fields by the user,
obtaining image data transmitted from an external apparatus,
obtaining a number of the external apparatus,
acquiring, from the address book, a name being associated with the obtained number of the external apparatus,
setting, using the acquired name and the setting rule specified in the setting screen, a filename to the received image data in a case where the specified setting rule includes a registered name as one of the types of information selected in the plurality of fields and the name being associated with the obtained number of the external apparatus is successfully acquired from the address book,
wherein the filename is set using a default name as a part of the filename in a case where the name being associated with the obtained number of the external apparatus is not successfully acquired from the address book, and
transferring, to a file server, the image data to which the filename has been set.

2. The image processing apparatus according to claim 1, wherein, if the number of the external apparatus is not registered in the address book, wherein setting includes setting the filename using the default name as a part of the filename.

3. The image processing apparatus according to claim 1, wherein obtaining includes obtaining the image data from the external apparatus by facsimile, and the number of the external apparatus is a facsimile number of the external apparatus.

4. The image processing apparatus according to claim 1, wherein transferring includes transferring the image data to the file server on a network.

5. An image processing method to be performed by an image processing apparatus having a storage unit configured to store an address book which registers a plurality of names associated with numbers, the image processing method comprising:
controlling to display a setting screen in which a user specifies a setting rule of a filename, wherein the setting screen displays a plurality of fields in which a user selects types of information to be used for the filename and further displays an arrangement order of the selected types of information by combining a separator and the types of information selected in the plurality of fields by the user;
obtaining image data transmitted from an external apparatus;
obtaining a number of the external apparatus;
acquiring, from the address book, a name being associated with the obtained number of the external apparatus;
setting, using the acquired name and the setting rule specified in the setting screen, a filename to the received image data in a case where the specified setting rule includes a registered name as one of the types of information selected in the plurality of fields and the name being associated with the obtained number of the external apparatus is successfully acquired from the address book,
wherein the filename is set using a default name as a part of the filename in a case where the name being associated with the obtained number of the external apparatus is not successfully acquired from the address book; and
transferring, to a file server, the image data to which the filename has been set.

6. The image processing method according to claim 5, wherein, if the number of the external apparatus is not registered in the address book, setting includes setting the filename using the default name as a part of the filename.

7. The image processing method according to claim 5, wherein receiving includes receiving the image data from the external apparatus by facsimile, and the number of the external apparatus is a facsimile number of the external apparatus.

8. The image processing method according to claim 5, wherein transferring includes transmitting the image data to the file server on a network.

9. A non-transitory computer-readable storage medium storing a program for causing an image processing apparatus to perform an image processing method, wherein the image processing apparatus includes a storage unit configured to store an address book which registers a plurality of names associated with numbers, the image processing method comprising:
- controlling to display a setting screen in which a user specifies a setting rule of a filename, wherein the setting screen displays a plurality of fields in which a user selects types of information to be used for the filename and further displays an arrangement order of the selected types of information by combining a separator and the types of information selected in the plurality of fields by the user;
- obtaining image data transmitted from an external apparatus;
- obtaining a number of the external apparatus;
- acquiring, from the address book, a name being associated with the obtained number of the external apparatus;
- setting, using the acquired name and the setting rule specified in the setting screen, a filename to the received image data in a case where the specified setting rule includes a registered name as one of the types of information selected in the plurality of fields and the name being associated with the obtained number of the external apparatus is successfully acquired from the address book,
- wherein the filename is set using a default name as a part of the filename in a case where the name being associated with the obtained number of the external apparatus is not successfully acquired from the address book; and
- transferring, to a file server, the image data to which the filename has been set.

* * * * *